US007924882B2

(12) United States Patent
Nagai et al.

(10) Patent No.: US 7,924,882 B2
(45) Date of Patent: Apr. 12, 2011

(54) PACKET FORWARDING APPARATUS SUITABLE FOR FORWARDING EXTENDED FRAME

(75) Inventors: Minoru Nagai, Fujisawa (JP); Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 12/146,726

(22) Filed: Jun. 26, 2008

(65) Prior Publication Data

US 2009/0067429 A1 Mar. 12, 2009

(30) Foreign Application Priority Data

Sep. 6, 2007 (JP) ................................. 2007-231204

(51) Int. Cl.
*H04J 3/16* (2006.01)
(52) U.S. Cl. .......................... 370/474; 370/468; 370/470
(58) Field of Classification Search .......... 370/470–474, 370/392–393; 389/43–58, 66–72
See application file for complete search history.

(56) References Cited

U.S. PATENT DOCUMENTS

| 7,130,303 | B2* | 10/2006 | Hadzic ........................... 370/389 |
| 7,752,324 | B2* | 7/2010 | Hamadeh et al. ............. 709/230 |
| 2006/0285548 | A1* | 12/2006 | Hill et al. ...................... 370/416 |
| 2007/0118677 | A1* | 5/2007 | Swartzentruber et al. .... 710/316 |
| 2008/0095368 | A1* | 4/2008 | Iida et al. ...................... 380/259 |
| 2008/0138067 | A1* | 6/2008 | Beshai ............................ 398/45 |

OTHER PUBLICATIONS

"An outline of next-generation wide-area Ethernet standard IEEE802.1ah", NTT Technical Journal, Jan. 2006.
"An outline of IEEE 802.1ah provider backbone bridge", NTT Technical Journal, Apr. 2006.

* cited by examiner

*Primary Examiner* — Thai D Hoang
(74) *Attorney, Agent, or Firm* — Brundidge & Stanger, P.C.

(57) ABSTRACT

A packet forwarding apparatus (L2SW) having a frame segmentation function of converting a extended Ethernet frame such as a MAC-in-MAC frame into a plurality of fragment frames when a payload length of the received frame exceeds a standard MTU size communicable in an Ethernet network to be a forwarding destination, by segmenting the received frame into a plurality of data blocks having a size not longer than the MTU size, and a frame assembling function of restoring an original extended frame from a series of fragment frames received from the Ethernet network.

17 Claims, 14 Drawing Sheets

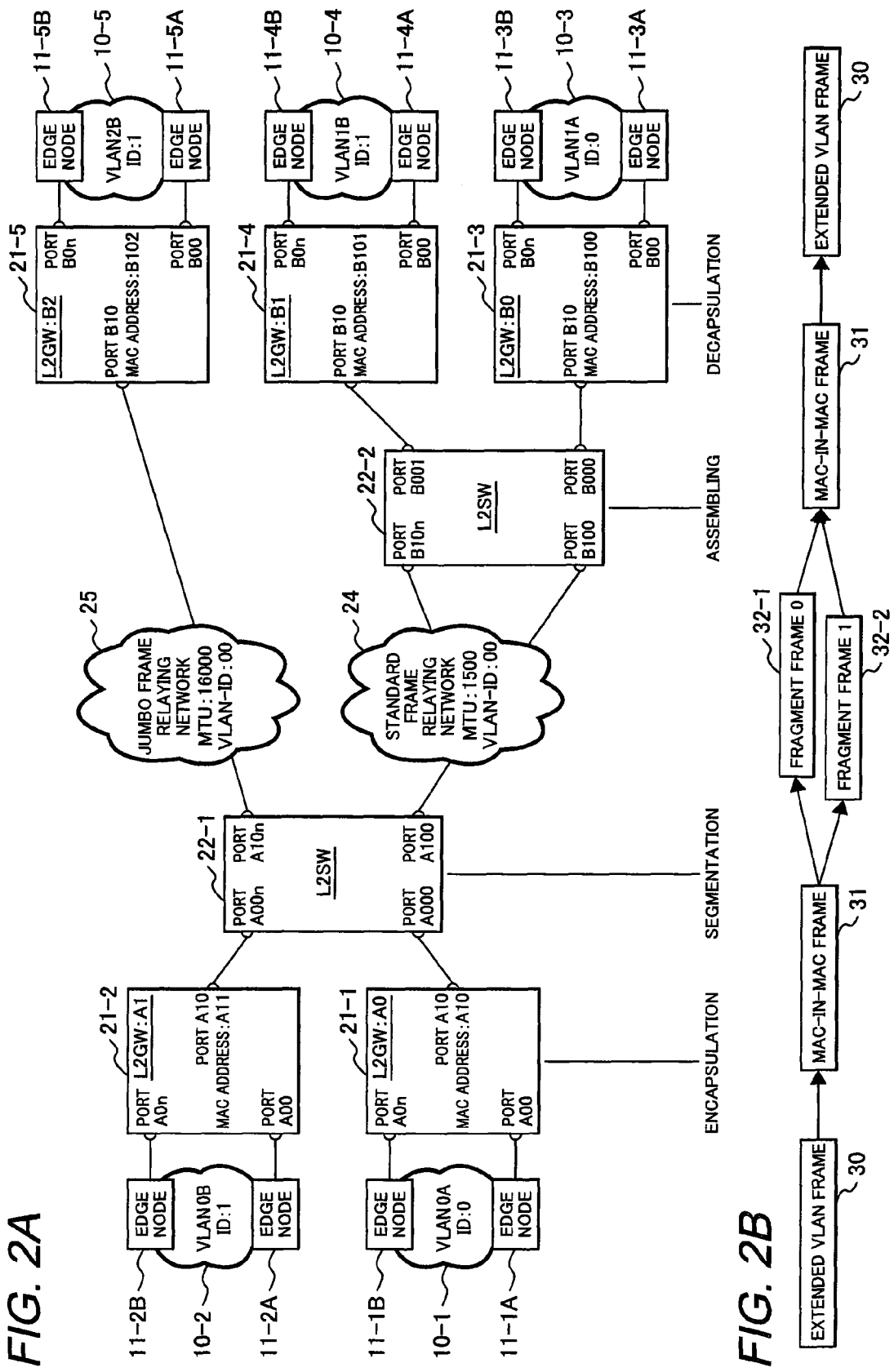

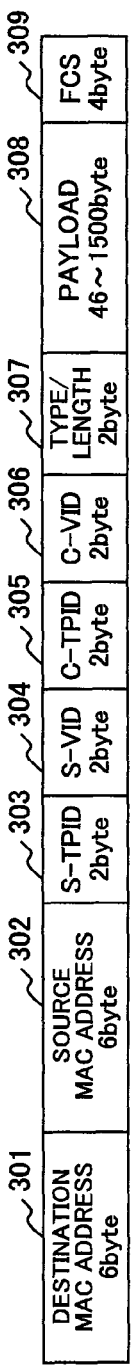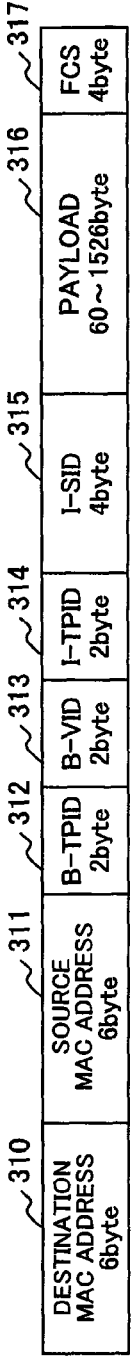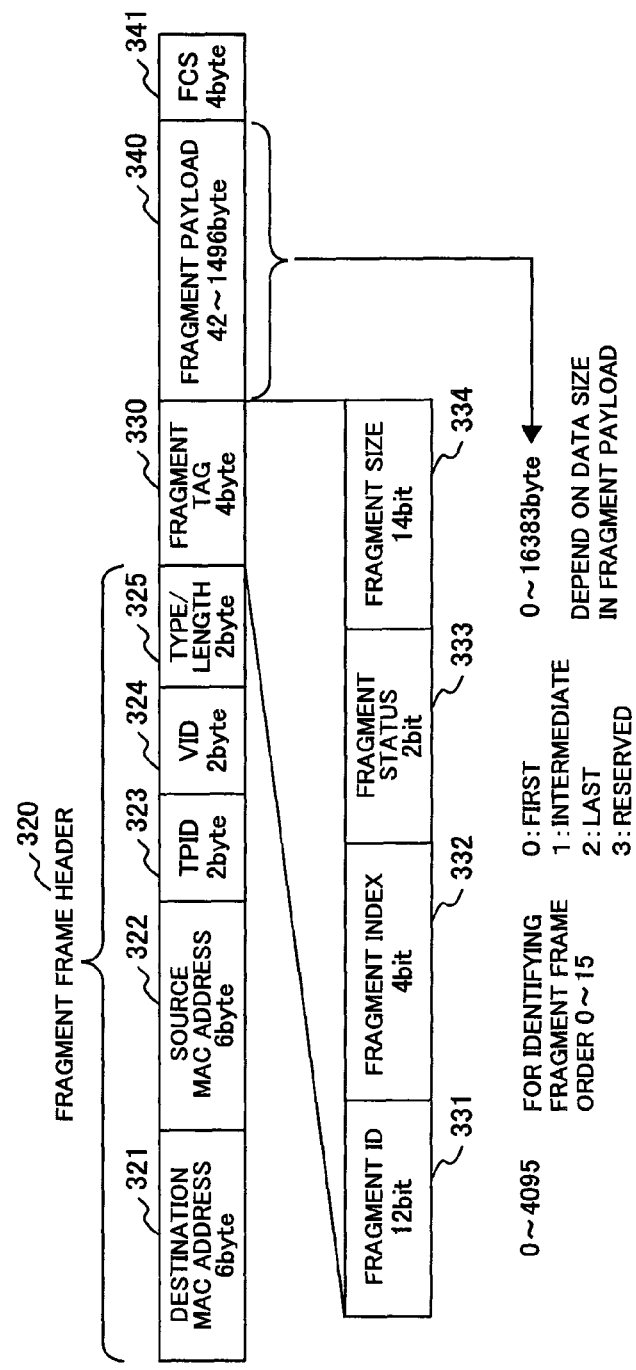

FIG. 7

PORT MANAGEMENT TABLE 41

| PORT ID | RECEIVING MTU | TRANSMITTING MTU | VLAN-ID | VALID TYPE |
|---------|---------------|------------------|---------|------------|
| A000 | 16000 | 16000 | 0 | 0x9100 |
| ⋮ | ⋮ | ⋮ | ⋮ | ⋮ |

SWITCHING INFORMATION MANAGEMENT TABLE 42

| MAC ADDRESS | VLAN-ID | PORT ID |
|-------------|---------|---------|
| A10 | 00 | A000 |
| ⋮ | ⋮ | ⋮ |

FRAGMENT ID MANAGEMENT TABLE 43

| FRAGMENT ID | STATUS FLAG |
|-------------|-------------|
| 0 | 1 |
| 1 | 0 |
| ⋮ | ⋮ |
| 16383 | 0 |

FRAGMENT ASSEMBLING MANAGEMENT TABLE 44

| FRAGMENT ID 441 | RECEIVING TIMER 442 | DESTINATION MAC ADDRESS 443 | SOURCE MAC ADDRESS 444 |
|---|---|---|---|
| 0 | 500 | B100 | A10 |
| ⋮ | ⋮ | ⋮ | ⋮ |

FIG. 11

ASSEMBLING PARAMETER MANAGEMENT TABLE 45

FRAGMENT ID : 450

| FRAGMENT STATUS 451 | FRAGMENT INDEX 452 | FRAGMENT POINTER 453 |
|---|---|---|
| 0 | 0 | A |
| 1 | 1 | B |
| ⋮ | ⋮ | ⋮ |

FIG. 12A

PORT MANAGEMENT TABLE 41A

| PORT ID | RECEIVING MTU | TRANSMITTING MTU | VLAN-ID | VALID TYPE |
|---------|---------------|------------------|---------|------------|
| A000 | 16000 | 16000 | 0 | 0x9100 |
| A00n | 16000 | 16000 | 1 | 0x9100 |
| A100 | 1500 | 1500 | 00 | 0x8100 |
| A10n | 16000 | 16000 | 00 | 0x9100 |

FIG. 12B

PORT MANAGEMENT TABLE 41B

| PORT ID | RECEIVING MTU | TRANSMITTING MTU | VLAN-ID | VALID TYPE |
|---------|---------------|------------------|---------|------------|
| B000 | 16000 | 16000 | 0 | 0x9100 |
| B001 | 16000 | 16000 | 1 | 0x9100 |
| B100 | 1500 | 1500 | 00 | 0x8100 |
| B10n | 1500 | 1500 | 00 | 0x8100 |

SWITCHING INFORMATION MANAGEMENT TABLE 42

FIG. 13A

| MAC ADDRESS (421) | VLAN-ID (422) | PORT ID (423) |
|---|---|---|
| null | null | null |

FIG. 13B

| A10 | 00 | A000 |
|---|---|---|

FIG. 13C

| A10 | 00 | B100 |
|---|---|---|

FRAGMENT ID MANAGEMENT TABLE 43

FIG. 14A

| FRAGMENT ID (431) | STATUS FLAG (432) |
|---|---|
| 0 | 0 |
| 1 | 0 |
| ⋮ | ⋮ |
| 16383 | 0 |

FIG. 14B

| FRAGMENT ID (431) | STATUS FLAG (432) |
|---|---|
| 0 | 1 |
| 1 | 0 |
| ⋮ | ⋮ |
| 16383 | 0 |

FIG. 15A

FRAGMENT ASSEMBLING MANAGEMENT TABLE 44

| FRAGMENT ID ~441 | RECEIVING TIMER ~442 | DESTINATION MAC ADDRESS ~443 | SOURCE MAC ADDRESS ~444 |
|---|---|---|---|
| null | null | null | null |

FIG. 15B

| 0 | 500 | B100 | A10 | ~EN0 |
|---|---|---|---|---|

FIG. 16A

ASSEMBLING PARAMETER MANAGEMENT TABLE 45

FRAGMENT ID : null ~450

| FRAGMENT STATUS 451 | FRAGMENT INDEX ~452 | FRAGMENT POINTER ~453 |
|---|---|---|
| null | null | null |

FIG. 16B

FRAGMENT ID : 0

| 0 | 0 | A | ~EN01 |
|---|---|---|---|

FIG. 16C

FRAGMENT ID : 0

| 0 | 0 | A | ~EN01 |
|---|---|---|---|
| 2 | 1 | B | ~EN02 |

US 7,924,882 B2

PACKET FORWARDING APPARATUS SUITABLE FOR FORWARDING EXTENDED FRAME

CLAIM OF PRIORITY

The present application claims priority from Japanese patent application serial No. 2007-231204, filed on Sep. 6, 2007, the content of which is hereby incorporated by reference into this application.

BACKGROUND OF THE INVENTION

1. Field of the Invention

The present invention relates to a packet forwarding apparatus, and more particularly, to a packet forwarding apparatus applicable to a wide area Ethernet network in which extended Ethernet (registered trademark) frames such as MAC-in-MAC frames are forwarded.

2. Related Art

With the spread of constructing intranets utilizing the Internet technology, a wide area network (WAN) for connecting a local area network (LAN) with another LAN has become widespread. The WAN started services at relatively high cost due to the use of low-speed telephone lines and dedicated lines. However, with the spread of high-speed XDSL and optical links, the WAN became able to provide services at low cost.

At the beginning, a user who wishes to use a communication protocol other than IP (Internet Protocol) in the WAN had to perform personally such a specific processing as protocol conversion, because IP was exclusively used as a communication protocol in the WAN. Thereafter, with the spread of VLAN (Virtual LAN) technology allowing a user to flexibly configure a network, there has been an increasing need for directly forwarding Ethernet frames on the WAN.

Under such circumstances, a wide area Ethernet service network capable of forwarding an Ethernet frame as it is has appeared. For example, as reported in NTT Technical Journal, January 2006, an extended VLAN defined in the next-generation wide-area Ethernet standard IEEE 802.1ah makes it possible to logically bind a plurality of users' VLANs on one network provided by a common carrier, by assigning an individual VLAN-ID to each user's VLAN. However, according to the extended VLAN scheme, users more than 4096 cannot be accommodated in one network. Further, when the number of users increases and the number of MAC addresses exceeds a limit value that can be processed by a layer 2 switch (L2SW) constituting the wide area Ethernet network, the L2SW disadvantageously loses frame forwarding function about specific users.

As one of technologies for solving these problems, a MAC-in-MAC scheme proposed in IEEE 802.1ah is known, as reported in NTT Technical Journal, April 2006, an outline of IEEE 802.1ah provider backbone bridge. The MAC-in-MAC scheme can increase the number of available VLAN-IDs by encapsulating an extended VLAN frame with an Ethernet header to convert it into a MAC-in-MAC frame. Further, by unifying a plurality of MAC addresses to be used individually by a plurality of users into one MAC address with the header of a MAC-in-MAC frame, the MAC-in-MAC scheme enables the L2SW to forward increased number of frames.

SUMMARY OF THE INVENTION

The header of an extended frame such as a MAC-in-MAC frame has compatibility with that of a standard Ethernet frame. However, in the case of MAC-in-MAC frame, a field for extending a VLAN ID is added between the header and a payload, and the payload accommodates the whole of extended VLAN frame, ranging from its header to the FCS at the frame end. Therefore, the MAC-in-MAC frame has a possibility that the payload length exceeds MTU (Maximum Transmission Unit) size of 1500 bytes in the standard Ethernet frame. When the payload length exceeds the standard MTU size, the MAC-in-MAC frame cannot pass through a standard Ethernet network.

Although a jumbo frame network extendable the maximum payload length by defining a frame length so as to be longer than that of the standard Ethernet frame is known, admissible frame length is different depending on a hardware vendor because there is no general standard on the jumbo frame. In a wide area network composed of communication nodes supplied by a plurality of vendors different in standard, therefore, communication has to be performed with jumbo frames having the minimum size in all communication paths and it becomes difficult to make the most of the advantage of the jumbo frame. Further, if a network section not supporting the jumbo frame exists on a communication path, there is a problem that jumbo frames cannot be forwarded in this section.

It is an object of the present invention to provide a packet forwarding apparatus (L2SW) suitable for forwarding an extended frame such as a MAC-in-MAC frame.

In order to attain the above object, according to the present invention, a packet forwarding apparatus (L2SW) for forwarding an extended Ethernet frame such as a MAC-in-MAC frame is provided with a frame segmentation function of converting a received frame into a plurality of fragment frames when a payload length of the received frame exceeds a standard MTU size communicable in an Ethernet network to be the forwarding destination of the received frame, by segmenting the received frame into a plurality of data blocks having a size not longer than the MTU size, and a frame assembling function of restoring an original extended frame from a series of fragment frames received from the Ethernet network.

In this context, the payload length of the received frame refers to a frame portion subsequent to a frame header having the same field length as a standard Ethernet header in the received extended frame.

More specifically, according to the invention, there is provided a packet forwarding apparatus having plural pairs of input and output ports to be identified by a port identifier and forwarding a frame received from each input port to one of output ports specified by a destination MAC address. The packet forwarding apparatus comprises: a switching information management table for storing, in association with each destination address, a port identifier indicating a forwarding destination port of a received frame; a port management table for storing a transmitting MTU size in association with each port identifier; routing means for specifying the forwarding destination port identifier of each received frame in accordance with the switching information management table; fragment frame creating means for segmenting a received frame into a plurality of data blocks not longer than the transmitting MTU size and creating a plurality of fragment frames each including one of the data blocks in its payload when the payload length of the received frame exceeds the transmitting MTU size corresponding to the forwarding destination port identifier indicated by the port management table; and frame assembling means for temporarily storing a plurality of fragment frames received by one of the input ports and restoring an original frame from the plurality of fragment frames, wherein one of the received frame, the fragment frames created by the fragment frame creating means, and the original frame restored by the frame assembling means is selectively forwarded to the output port having the forwarding destination port identifier specified by the routing means.

Since the packet forwarding apparatus according to the invention has the frame segmentation function and the frame assembling function, it is possible to forward a received frame to a standard Ethernet network having a limitation on MTU when the received frame has a format that extends a standard Ethernet frame such as a MAC-in-MAC frame, even if a frame other than the MAC-in-MAC frame is received.

Further, by applying the packet forwarding apparatus according to the invention as a connection node between heterogeneous networks different in frame format or MTU, it is possible to efficiently forward communication frames without adjusting the data size by each transmitting user. Furthermore, in a wide area network including a plurality of types of relaying networks having different MTUs, it is possible to forward a large MTU frame without adjusting the data size at transmitting side.

BRIEF DESCRIPTION OF THE DRAWINGS

FIG. 2A is a diagram showing an example of a connection model for explaining a frame forwarding operation in the network of FIG. 1, and FIG. 2B is a diagram showing the process of frame conversion;

FIG. 3A is a diagram showing the format of an extended VLAN frame 30, FIG. 3B is a diagram showing the format of a MAC-in-MAC frame 31, and FIG. 3C is a diagram showing the format of a fragment frame 32;

FIG. 7 is a diagram showing an example of a port management table 41;

FIG. 8 is a diagram showing an example of a switching information management table 42;

FIG. 9 is a diagram showing an example of a fragment ID management table 43;

FIG. 10 is a diagram showing an example of a fragment assembling management table 44;

FIG. 11 is a diagram showing an example of an assembling parameter management table 45;

FIG. 12A is a diagram showing an example of setting values in a port management table 41A of the L2SW 22-1, and FIG. 12B is a diagram showing an example of setting values in a port management table 41B of the L2SW 22-2;

FIGS. 13A, 13B, and 13C are diagrams for explaining the change of contents in the switching information management table 42;

FIGS. 14A and 14B are diagrams for explaining the change of contents in the fragment ID management table 43;

FIGS. 15A and 15B are diagrams for explaining the change of contents in the fragment assembling management table 44;

FIGS. 16A, 16B, and 16C are diagrams for explaining the change of contents in the assembling parameter management table 45;

DETAILED DESCRIPTION OF THE EMBODIMENTS

Hereinafter, an embodiment of the present invention will be described in detail with reference to the accompanying drawings.

Figure 1:
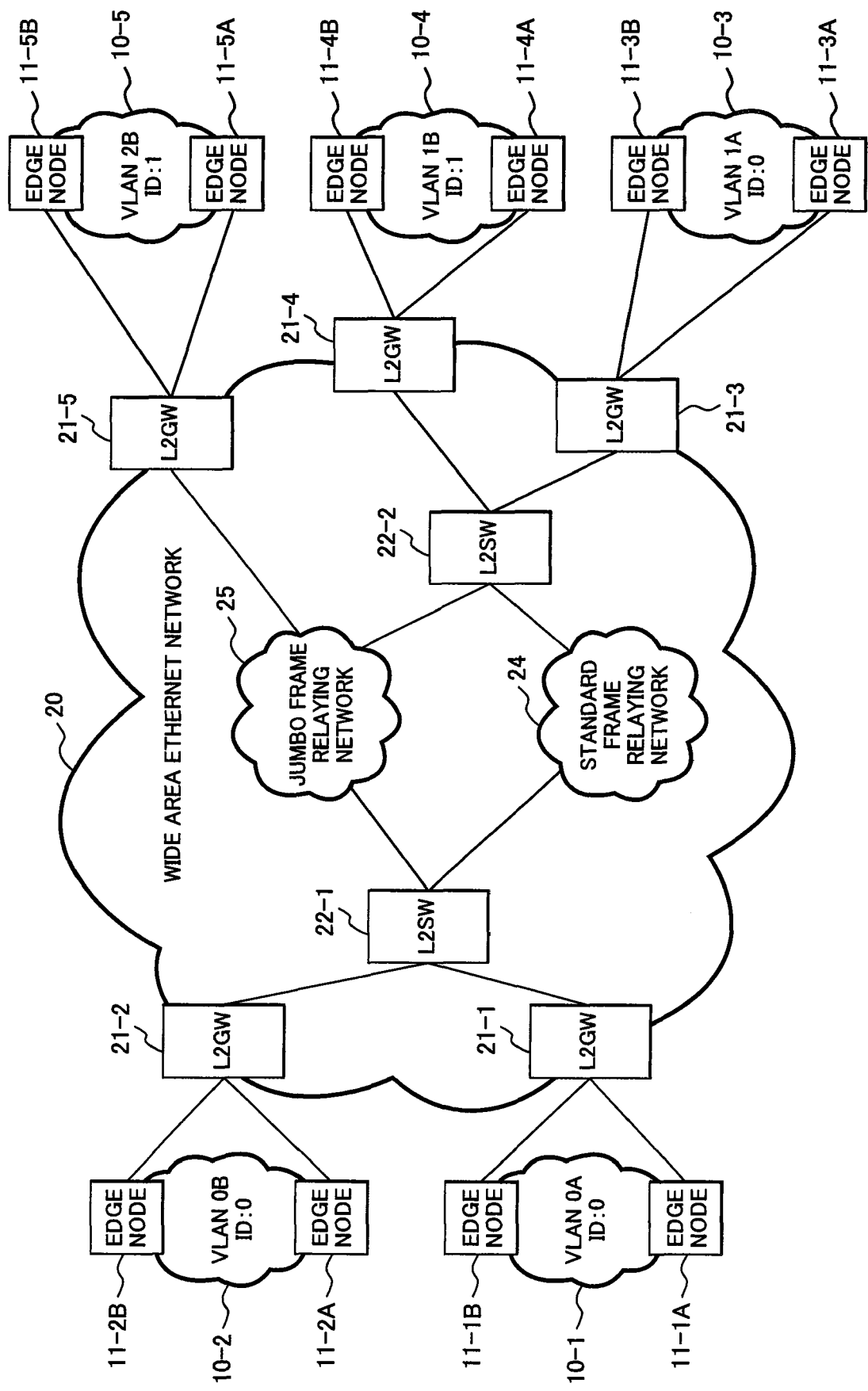
FIG. 1 is a schematic diagram showing an example of a network configuration to which a layer 2 switch (L2SW) according to the present invention is applied.

FIG. 1 shows an example of a network configuration to which a packet forwarding apparatus (layer 2 switch: L2SW) according to the invention is applied.

A wide area Ethernet network 20 is composed of a standard frame relaying network 24, a jumbo frame relaying network 25, a plurality of layer 2 gateways (L2GW) 21 (21-1 to 21-5), and a plurality of layer 2 switches (L2SW) 22 (22-1, 22-2). Numeral 10 (10-1 to 10-5) indicates a VLAN for accommodating a plurality of user terminals or servers not shown in FIG. 1.

Each VLAN 10 is connected through at least one edge node 11 (11-1A to 11-5B) to one of the L2GWs 21 which is a connection point of the wide area Ethernet network 20. In the example of FIG. 1, each VLAN 10 is connected through two edge nodes 11 to one of L2GWs, and each L2GW 21 is connected via an L2SW 22 to the standard frame relaying network 24 or the jumbo frame relaying network 25.

FIG. 2A shows an example of a connection model for explaining a frame forwarding operation performed via the L2SWs 22-1 and 22-2 in the network of FIG. 1. In this example, although description will be made of communication between a VLAN 0A: 10-1 and a VLAN 1A: 10-3 via the standard frame relaying network 24, a similar operation is performed in communication between other VLANs such as a VLAN 0B: 10-2 and a VLAN 1B: 10-4 via the standard frame relaying network 24.

For example, assume that a user terminal "A" connected to the VLAN 0A: 10-1 transmits a packet to a user terminal "B" connected to the VLAN 1A: 10-3. The packet transmitted from the user terminal "A" is forwarded in a VLAN frame format to an edge node 11-1A of the VLAN 0A. The edge node 11-1A is connected to a port A00 of the L2GW 21-1.

As shown in FIG. 2B, when the edge node 11-1A receives the VLAN frame from the user terminal "A", the edge node 11-1A converts the received VLAN frame into an extended VLAN frame 30 addressed to the VLAN 1A: 10-3, and forwards it to the L2GW 21-1. Upon receiving the extended VLAN frame at the port A00, the L2GW 21-1 accommodates the received frame into the payload of a MAC-in-MAC frame 31, and transmits it to the L2SW 22-1 through a port A10.

In the network configuration shown in FIG. 2A, the L2SW 22-1 is connected through the standard frame relaying network 24, the L2SW 22-2, and the L2GW 21-3 to the VLAN 1A: 10-3 which is the destination of the MAC-in-MAC frame 31. Assume here that the MTU size of the standard frame relaying network 24 is 1500 bytes and the payload length of the MAC-in-MAC frame 31 exceeds the MTU size of the relaying network 24.

When the L2SW 22-1 judges that the received MAC-in-MAC frame 31 cannot pass through the relaying network 24 as it is, the L2SW 22-1 converts the received frame into a plurality of fragment frames 32 (32-1 and 32-2 in this example) each having a size transmittable by the relaying network 24. These fragment frames 32 are forwarded to the standard frame relaying network 24 through a port A100.

In the wide area Ethernet network 20, each node forwards a received frame in accordance with a VLAN-ID. The fragment frames 32 transmitted from the L2SW 22-1 are forwarded to a port B100 of the L2SW 22-2 by the relaying network 24.

Upon receiving the first fragment frame 32-1, the L2SW 22-2 temporarily stores the received frame and waits for the next fragment frame 32-2. When a series of fragment frames created by the L2SW 22-1 have been received, the L2SW 22-2 restores the original MAC-in-MAC frame 31. The restored MAC-in-MAC frame 31 is forwarded to the L2GW 21-3 through a port B000.

Upon receiving the MAC-in-MAC frame 31, the L2GW 21-3 extracts the extended VLAN frame 30 from its payload, and transmits the VLAN frame 30 through a port B00 connected to an edge node 11-3A of the destination VLAN 1A: 10-3. The extended VLAN frame 30 is sent to the VLAN 1A: 10-3 by the edge node 11-3A and forwarded to the destination user terminal "B".

FIG. 3A shows the format of the extended VLAN frame 30.

The extended VLAN frame 30 is composed of a destination MAC address field 301, a source MAC address field 302, an S-TPID tag field 303, an S-VID tag field 304, a C-TPID tag field 305, a C-VID tag field 306, a type/length field 307, a payload 308, and a FCS field 309, and has a maximum frame length of 1526 bytes.

FIG. 3B shows the format of the MAC-in-MAC frame 31.

The MAC-in-MAC frame 31 is composed of a destination MAC address field 310, a source MAC address field 311, a B-TPID tag field 312, a B-VID tag field 313, an I-TPID tag field 314, an I-SID tag field 315, a payload 316, and a FCS field 317, and has a maximum frame length of 1552 bytes.

The payload 316 of the MAC-in-MAC frame accommodates the whole of the extended VLAN frame 30. The maximum payload length of the MAC-in-MAC frame is 1526 bytes. Accordingly, if the payload length of the extended VLAN frame 30 is close to the maximum value, there is a possibility that the relaying network 24 cannot forward the MAC-in-MAC frame because the payload 316 of the MAC-in-MAC frame exceeds the MTU size (1500 bytes) of the standard frame relaying network 24.

FIG. 3C shows the format of the fragment frame 32.

The fragment frame 32 is composed of a fragment header 320, a fragment tag 330, a fragment payload 340, and a FCS field 341. The fragment header 320 is composed of a destination MAC address field 321, a source MAC address field 322, a TPID tag field 323, a VID tag field 324, a type/length field 325, and has a header structure similar to the MAC-in-MAC frame.

The fragment tag 330 is composed of a fragment ID field 331 for uniquely identifying the fragment frame, a fragment index field 332 indicating fragment frame order, a fragment status field 333 indicating which of the first, intermediate, and last parts of the original frame is carried by this fragment frame, and a fragment size field 334 indicating the length of the subsequent fragment payload 340.

The contents of the fragment frame header 320 are common to all fragment frames created from the same MAC-in-MAC frame. In the present invention, the MAC-in-MAC frame 31 is segmented into a plurality of blocks to be distributed to the payloads 340 of the fragment frames 32, so that the standard frame relaying network 24 can forward the contents of the MAC-in-MAC frame.

In this embodiment, it is assumed that the L2SWs 22 are also connected to a relaying network that is communicable only a MAC frame with a VLAN tag in the wide area Ethernet network. In this case, since the fragment frame must have the same format and the same frame length as the MAC frame with a VLAN tag, the MAC header cannot include additional information specific to the fragment frame.

In the format of the fragment frame 32 shown in FIG. 3C, the fragment tag 330 needs 4 bytes. That is, 4 bytes in a maximum payload length (1500 bytes) transmittable in the standard frame relaying network 24 are spent for the fragment tag 330. For this reason, the maximum payload length (the length of the fragment payload 340) usable as effective MTU is shortened to 1496 bytes and the minimum payload length is set to 42 bytes. However, the invention does not limit the fragment frame 32 to the format shown in FIG. 3C, and it is possible to adopt a fragment frame having MTU over 1500 bytes.

Figure 4:
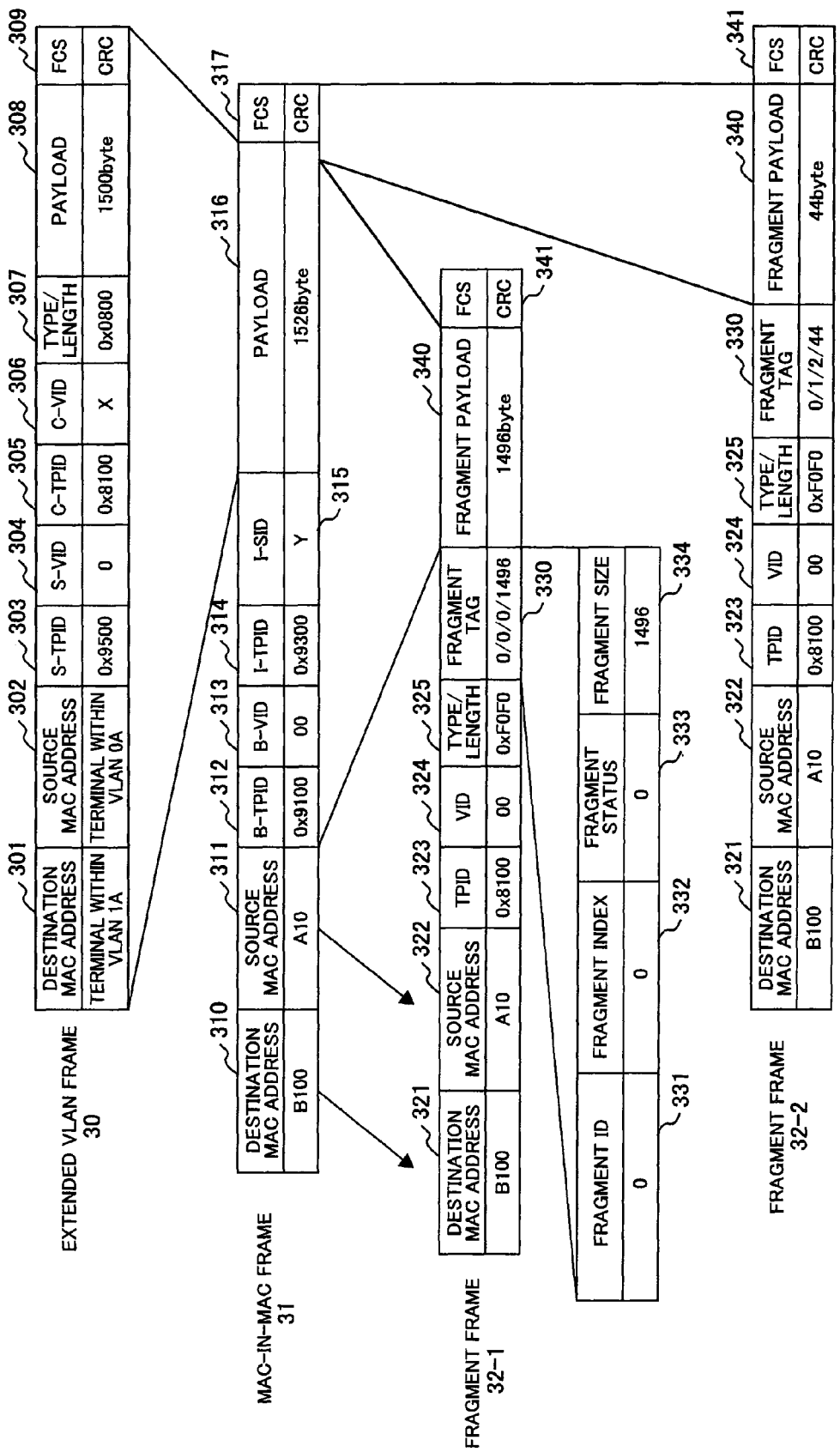
FIG. 4 is a diagram showing the relationship among the extended VLAN frame 30 created by an edge node 11-1A, the MAC-in-MAC frame 31 created by an L2GW 21-1, and fragment frames 32-1 and 32-2 created by an L2SW 22-1.

FIG. 4 shows the relationship among the extended VLAN frame 30 created by the edge node 11-1A, the MAC-in-MAC frame 31 created by the L2GW 21-1, and the fragment frames 32-1 and 32-2 created by the L2SW 22-1.

The extended VLAN frame 30 created by the edge node 11-1A includes the MAC address of the user terminal "B" in the destination MAC address field 301, and the MAC address of the user terminal "A" in the source MAC address field 302.

A tag identification number "0x9500" and a VLAN ID "0" which are designated by a common carrier that provides the source VLAN 0A: 10-1 are set to the S-TPID tag field 303 and the S-VID tag field 304, respectively. A tag identification number "0x8100" and a VLAN ID "X" which are used by a user are set to the C-TPID tag field 305 and the C-VID tag field 306 respectively, and "0x0800" indicating the protocol type of a packet accommodated in the payload 308 and the payload length is set to the type/length field 307. A packet (or data) to be communicated between the terminals is accommodated in the payload 308, and the value of a checksum (CRC) calculated based on the message contents from the first field 301 to the payload 308 is set to the FCS field 309.

Upon receiving the extended VLAN frame 30, the L2GW 21-1 creates the MAC-in-MAC frame 31 which accommodates the extended VLAN frame 30 into the payload 316. The MAC-in-MAC frame 31A includes a MAC address "B100" indicating the port B10 of the L2GW 21-3 in the destination MAC address field 310, and a MAC address "A10" indicating the port A10 of the L2GW 21-1 in the source MAC address field 311.

A tag identification number "0x9100" and a VLAN ID "00" which are designated by a common carrier that provides the wide area Ethernet network are set to the B-TPID tag field 312 and the B-VID tag field 313, respectively. A tag identification number "0x9300" and a VLAN ID "Y" to be used by a common carrier that receives the service of the wide area Ethernet network are set to the I-TPID tag field 314 and the I-SID tag field 315, respectively. The payload 316 includes the whole of the extended VLAN frame 30, and the value of a checksum (CRC) calculated based on the message contents from the first field 310 to the payload 316 is set to the FCS field 317.

Upon receiving the MAC-in-MAC frame 31, the L2SW 22-1 creates the first fragment frame 32-1 and the second fragment frame 32-2 from the received frame.

In the destination MAC address field 321 and the source MAC address field 322 of the first fragment frame 32-1, the values of the destination MAC address field 310 and the source MAC address field 311 extracted from the MAC-in-MAC frame 31 are set, respectively. In the TPID tag field 323 and the VID tag field 324, a tag identification number "0x8100" and a VLAN ID value "00" which are designated by the standard frame relaying network 24 are set, respectively. A type value "0xF0F0" indicating a fragment frame is set to the type/length field 325.

The fragment tag field 330 of the fragment frame 32-1 includes in the fragment ID field 331 an ID value "0" assigned to the MAC-in-MAC frame 31 by the L2SW 22-1, a fragment frame creation order value "0" in the fragment index field 332, a value "0" indicating the first frame in the fragment status field 333, and a value "1496" indicating the length of the fragment payload 340 in the fragment size field 334. Further, 1496-byte message contents starting from the B-TPID tag field 312 of the MAC-in-MAC frame 31 are accommodated in the fragment payload 340 of the fragment frame 32-1, and the value of a checksum (CRC) calculated based on the message contents from the first field (destination MAC address field) 321 to the payload 340 is set to the FCS field 341.

The second fragment frame 32-2 includes, as fragment frame header 320 (fields 321 to 325), the same header as that of the first fragment frame 32-1. The fragment tag field 330 of the fragment frame 32-2 includes in the fragment ID field 331 an ID value "0" which is the same as in the fragment frame 32-1, a creation order value "1" in the fragment index field 332, a value "2" indicating the last frame in the fragment status field 333, and a value "44" indicating the length of the fragment payload 340 in the fragment size field 334. In the fragment payload 340 of the fragment frame 32-2, the remaining portion of the MAC-in-MAC frame is accommodated, and the value of a checksum (CRC) calculated based on the message contents from the first field (destination MAC address field) 321 to the payload 340 is set to the FCS field 341.

If the length of remaining block of the MAC-in-MAC frame is less than 42 bytes which is the minimum payload length of the fragment frame, the deficiency portion other than the remaining block in 42 bytes is padded with padding bytes having a value "0x00". In this case, the length of a valid block in the fragment payload 340 is set to the fragment size field 334. For example, if the remaining block length of the MAC-in-MAC frame is 34 bytes and the number of padding bytes is eight, a value "34" is set to the fragment size field 334.

Figure 5:
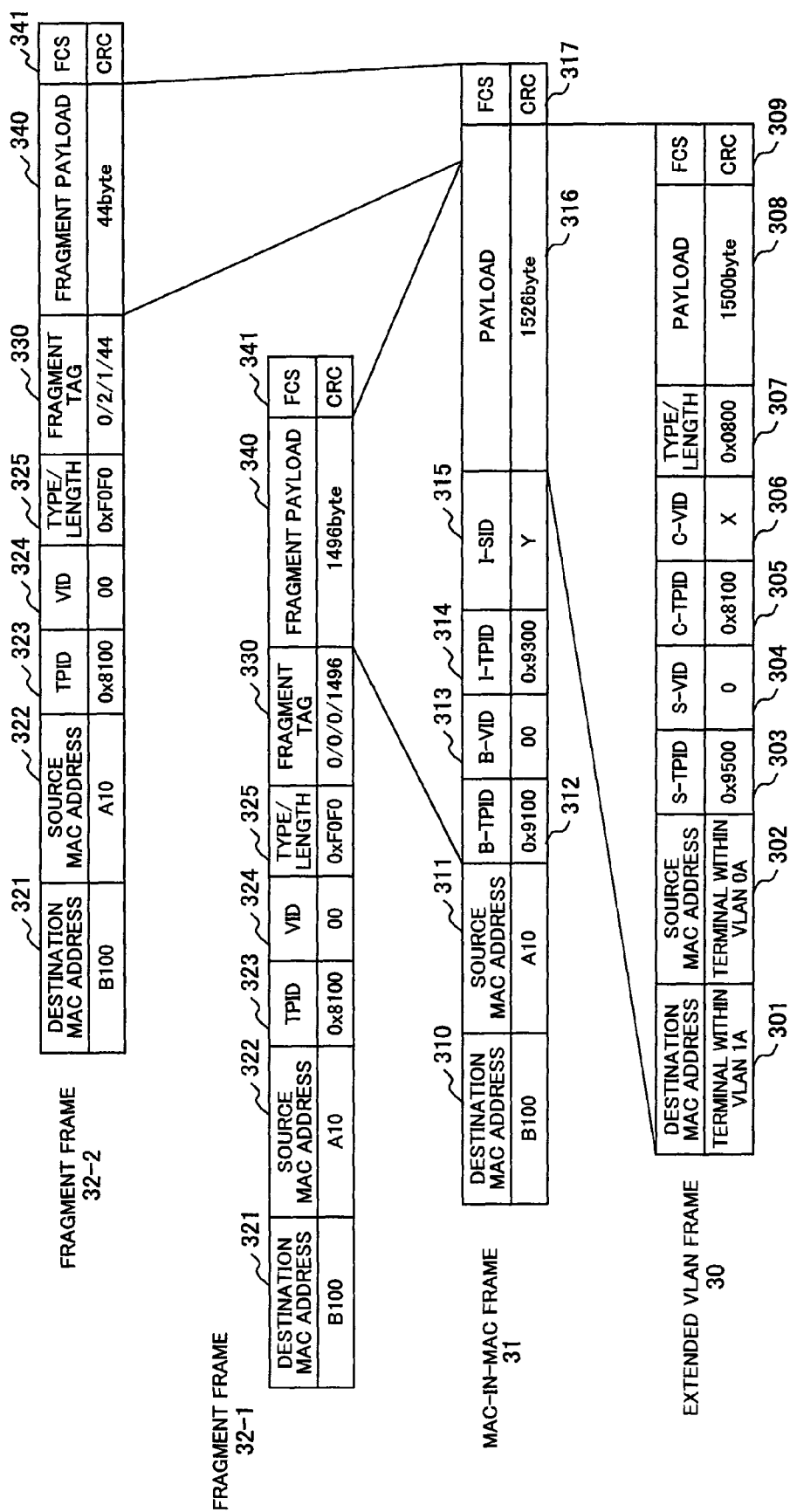
FIG. 5 is a diagram showing the relationship among the fragment frames 32-1 and 32-2, the MAC-in-MAC frame 31 reproduced by an L2SW 22-2, and the extended VLAN frame 30 reproduced by an L2GW 21-3.

FIG. 5 shows the relationship among the fragment frames 32-1 and 32-2, the MAC-in-MAC frame 31 reproduced by the L2SW 22-2, and the extended VLAN frame 30 reproduced by the L2GW 21-3.

When the L2SW 22-2 receives the second fragment frame 32-2 shown in FIG. 4 after the first fragment frame 32-1 was received, the L2SW 22-2 extracts data blocks from the fragment payload 340 of these fragment frames having the same fragment ID and concatenates these data blocks in the order shown by the fragment index 332.

The L2SW 22-2 can reproduce the original MAC-in-MAC frame 31 by adding, as the destination MAC address 310 and the source MAC address 311 at the front of the concatenated data blocks, the values of the destination MAC address field 321 and the source MAC address field 322 extracted from the frame header of the fragment frame 32-1 (or the fragment frame 32-2). Further, the L2GW 21-3 can reproduce the extended VLAN frame 30 by extracting the contents of the payload 316 from the MAC-in-MAC frame 31.

Figure 6:
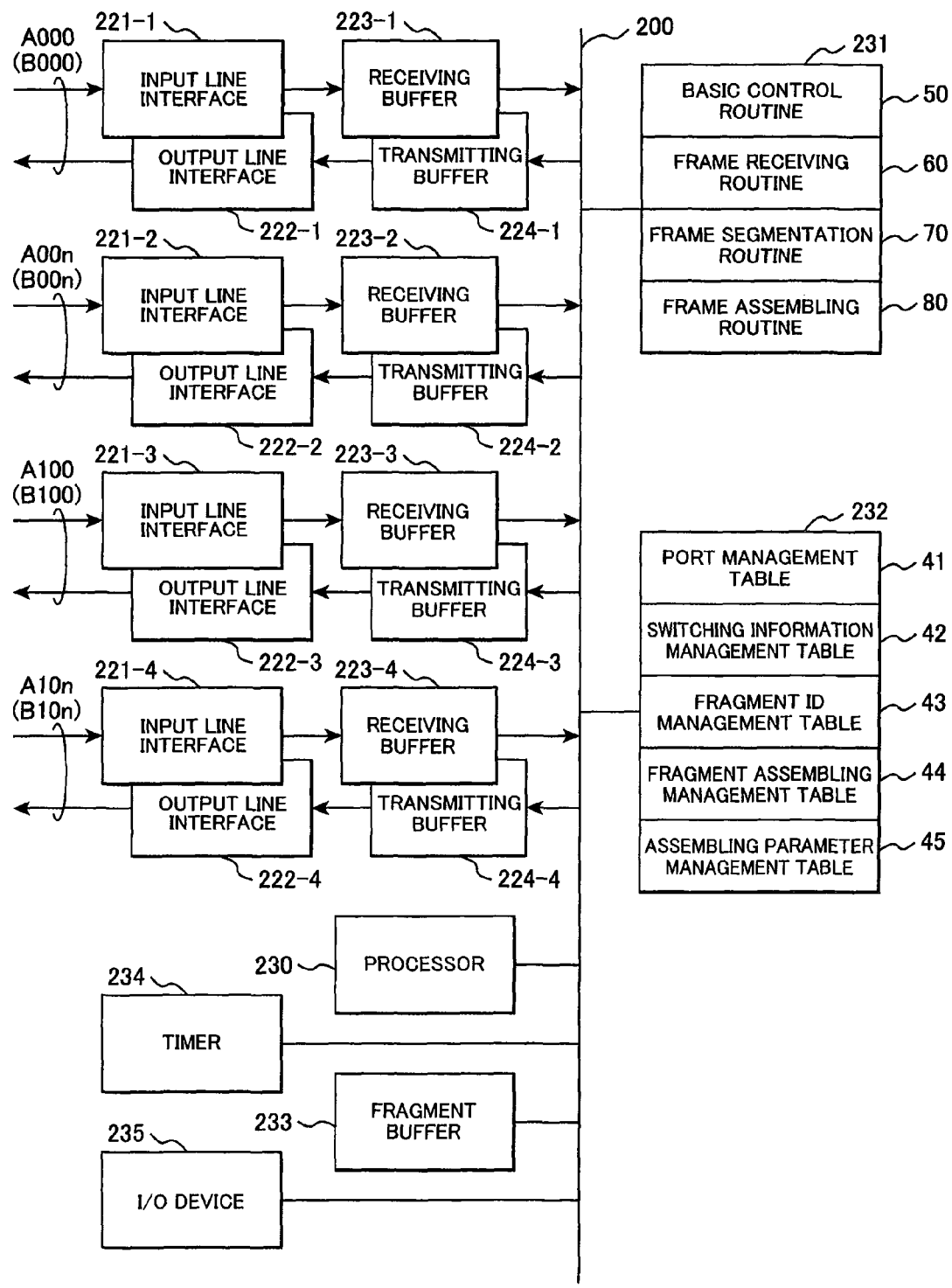
FIG. 6 is a block diagram of the L2SW 22 according to an embodiment of the invention.

FIG. 6 is a block diagram of the L2SW 22 (22-1, 22-2) according to an embodiment of the invention.

The L2SW 22 comprises plural pairs of input line interface 221 (221-1 to 221-4) and output line interface 222 (222-1 to 222-4) corresponding to the port identifiers A000 (B000) to A10n (B10n) shown in FIG. 2, receiving buffers 223 (223-1 to 223-4) each connected between the input line interface 221 and an internal bus 200, transmitting buffers 224 (224-1 to 224-4) each connected between the output line interface 222 and the internal bus 200. The L2SW 22 further includes a processor 230, a program memory 231, a data memory 232, a fragment buffer 233, a timer 234, and an I/O device 235, each of which is connected to the internal bus 200.

In the program memory 231, a basic control routine 50, a frame receiving routine 60, a frame segmentation routine 70, and a frame assembling routine 80 which will be described in detail later are prepared as programs relating to the invention. These programs are executed by the processor 230. In the data memory 232, a port management table 41, a switching information management table 42, a fragment ID management table 43, a fragment assembling management table 44, and a assembling parameter management table 45 are formed.

FIG. 7 shows an example of the port management table 41. The port management table is composed of a plurality of table entries each having a port identifier (port ID) 411 assigned to each port of the L2SW. Each table entry includes, in association with the port ID 411, a receiving MTU 412 indicating the size of MTU receivable by the input port, a transmitting MTU 413 indicating the size of MTU transmittable by the output port, that is, the size of MTU receivable by a receiving node connected to the output port, a VLAN-ID 414 indicating a VLAN-ID value to be added to each frame admitted by the input port, and a valid type 415 indicating a tag identifier that the input port can recognize.

FIG. 8 shows an example of the switching information management table 42. The switching information management table 42 is composed of a plurality of table entries. Each table entry indicates, in association with a MAC address 421 of frame source or destination, a VLAN-ID 422, and a port ID 423 of an input or an output port of frames.

FIG. 9 shows an example of the fragment ID management table 43. The fragment ID management table 43 is composed of a plurality of table entries. Each table entry indicates the correspondence between a fragment ID 431 for identifying fragment frames belonging to the same group and a status flag 432 indicating a status of the fragment ID. The status flag 432 is "1", when the fragment ID is in a use state and "0" when the fragment ID is in an available or idle state.

FIG. 10 shows an example of the fragment assembling management table 44. The fragment assembling management table 44 is composed of a plurality of table entries each having a fragment ID 441. Each table entry indicates, in association with the fragment ID 441, a receiving timer value 442, a destination MAC address 443, and a source MAC address 444.

FIG. 11 shows an example of the assembling parameter management table 45. The assembling parameter management table 45 includes a plurality of table entries for each fragment ID 450. Each entry indicates the correspondence among a fragment status 451, a fragment index 452, and a fragment pointer 453 indicating the storage location of fragment data.

Prior to the start of operating the L2SWs 22-1 and 22-2 shown in FIG. 1, a system administrator sets initial data in the management tables 41 to 45, using the I/O device 235. The processor 230 controls the I/O device 235 in accordance with the basic control routine 50 to set the initial data inputted by the system administrator in the management tables.

In a port management table 41A of the L2SW 22-1, for example, as shown in FIG. 12A, values of the receiving MTU 412, the transmitting MTU 413, the VLAN-ID 414 for permitting communication, and the valid type 415 are set in association with each available port ID 411. Similarly, for example, as shown in FIG. 12B, values of the receiving MTU 412, the transmitting MTU 413, the VLAN-ID 414 for permitting communication, and the valid type 415 are set in association with each available port ID 411 in a port management table 41B of the L2SW 22-2.

As shown in FIG. 13A, in the switching information management table 42 of the L2SWs 22-1 and 22-2, an initial value "null" is set to each field of the MAC address 421, the VLAN-ID 422, and the port ID 423.

As shown in FIG. 14A, in the fragment ID management table 43 of the L2SWs 22-1 and 22-2, available ID values are set to the fragment ID 431, and an initial value "0" indicating an available status is set to the status flag 432.

As shown in FIG. 15A, in the fragment assembling management table 44 of the L2SWs 22-1 and 22-2, an initial value "null" is set to each field of the fragment ID 441, the receiving timer 442, the destination MAC address 443, and the source MAC address 444.

As shown in FIG. 16A, in the assembling parameter management table 45 of the L2SWs 22-1 and 22-2, an initial value "null" is set to each field of the fragment ID 450, the fragment status 451, the fragment index 452, and the fragment pointer 453.

Hereinafter, the operation of the L2SWs 22 according to the invention will be described in detail, with reference to the L2SW 22-1 in FIG. 2 about the frame receiving routine and the frame segmentation routine, and with reference to the L2SW 22-2 in FIG. 2 about the frame assembling routine.

The L2SW 22-1 transmits and receives MAC-in-MAC frames through the port A000 and the port A00n. The port A100 transmits and receives fragment frames or MAC-in-MAC frames each having MTU not greater than 1500 bytes. The port A10n transmits and receives MAC-in-MAC frames. MAC-in-MAC frames received at the port A10n may have MTU greater than 1500 bytes.

Each of the input line interfaces 221 (221-1 to 221-4) stores frames received through the input port (input line) into the receiving buffer 223 (223-1 to 223-4) in the order received. Each of the output line interfaces 222 (222-1 to 222-4) sequentially reads out transmission frames outputted to the transmitting buffer 224 (224-1 to 224-4) through the internal bus 200 by the processor 230, and sends them out to each output port (output line).

The processor 230 cyclically accesses the receiving buffers 223-1 to 223-4 to read out received frames, MAC-in-MAC frames 31 or fragment frames 32, in accordance with the basic control routine 50, and processes these received frames in accordance with the frame receiving routine 60.

Figure 17:
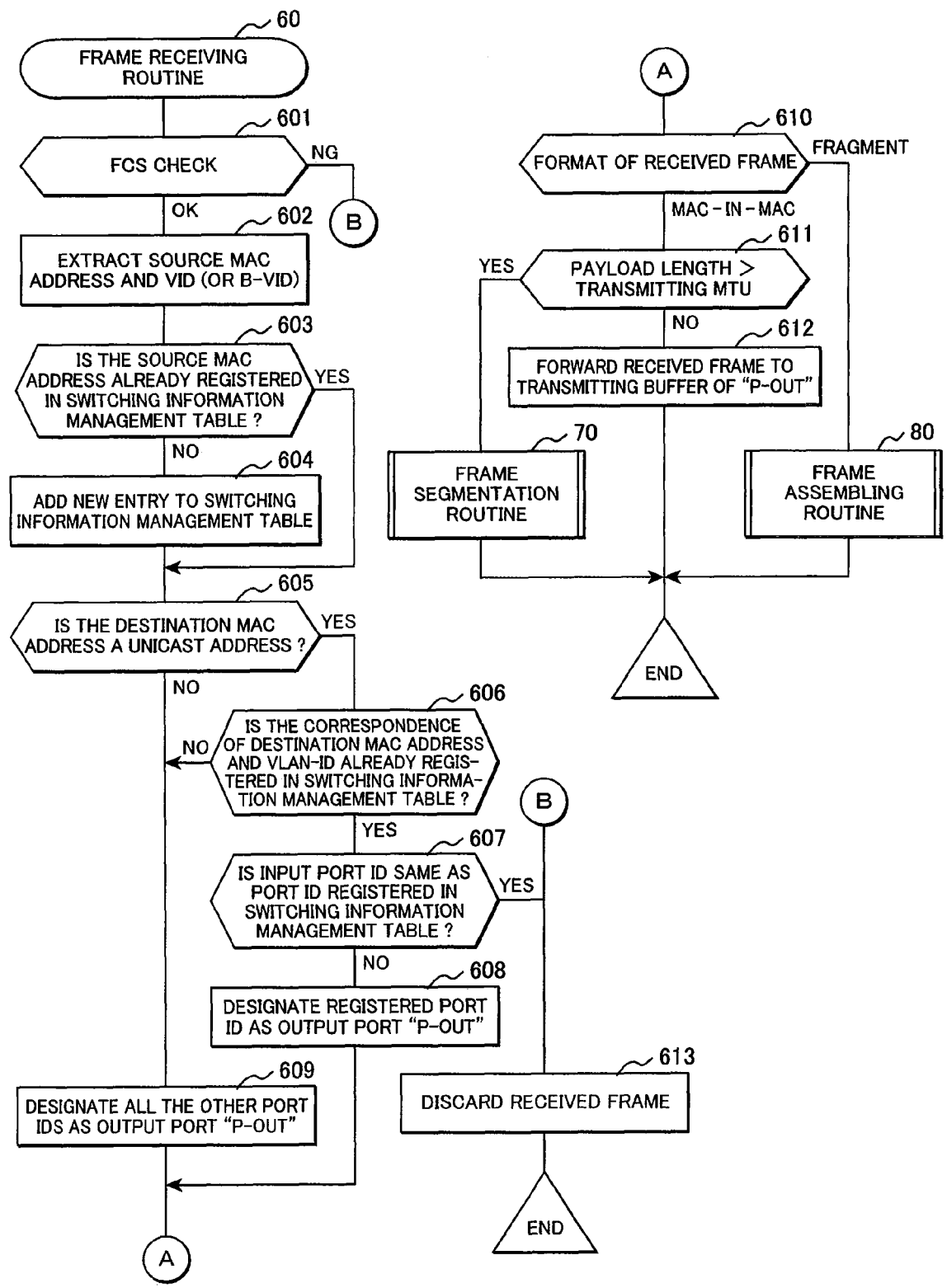
FIG. 17 is a flowchart of a frame receiving routine 60.

FIG. 17 shows a flowchart of the frame receiving routine 60.

In the frame receiving routine 60, the processor 230 calculates FCS of each received frame, and checks the value of the FCS field at the end of the received frame (step 601). If an FCS error is detected, the processor 230 discards the received frame (613), and exits the routine 60. In this case, the processor 230 reads out a new received frame from the next receiving buffer 223 in accordance with the basic control routine 50, and executes the frame receiving routine 60.

When no FCS error is detected, the processor 230 extracts the value of the source MAC address 311 or 322 from the second field (the 7th byte to the 12th byte) of the received frame, and the value of the B-VID 313 or the VID 324 from the fourth field (the 15th byte and the 16th byte) of the received frame (602).

Then, the processor 230 determines whether the source MAC address extracted has already been registered as the MAC address 421 in the switching information management table 42 (603). If the source MAC address has not been registered, the processor 230 creates a new table entry which includes the value of the source MAC address (311 or 322) extracted from the received frame in the MAC address 421, the value of the VLAN-ID (B-VID 313 or VID 324) extracted from the received frame in the VLAN-ID 422, and the port ID of the input port of the received frame in the port ID 423, and registers the new table entry to the switching information management table 42 (604). For example, when the L2SW 22-1 receives the MAC-in-MAC frame 31 shown in FIG. 4 from the L2GW 21-1, a new table entry shown in FIG. 13B is registered in the switching information management table 42.

The processor 230 determines whether the destination MAC address 310 or 321 indicated by the first field (the 1st byte to the 6th byte) of the received frame is a unicast address or not (605). If the destination MAC address is a broadcast address or a multicast address, the processor 230 designates, as output ports P-Out of the received frame, all ports except the input port (609), and determines the format of the received frame (610).

If the destination MAC address is determined as a unicast address at step 605, the processor 230 checks whether the correspondence between the destination MAC address and the VLAN-ID (B-VID 313 or VID 324) has already been registered as the MAC address 421 and the VLAN-ID 422 in the switching information management table 42 (606). If the destination MAC address and the VLAN-ID have not been registered, the processor 230 designates, as output ports P-Out of the received frame, all ports except the input port (609), and determines the format of the received frame (610).

At step 606, if the destination MAC address and the VLAN-ID of the received frame have already been registered in the switching information management table 42, the processor 230 determines whether the input port ID of the received frame coincides with the port ID 423 registered in the switching information management table 42 (607). When the input port ID of the received frame coincides with the port ID 423 registered in the switching information management table 42, the processor 230 discards the received frame (613), and exits the routine 60.

When the input port ID of the received frame does not coincide with the port ID 423 registered in the switching information management table 42, the processor 230 designates, as an output port P-Out of the received frame, a port ID registered in the switching information management table 42 (608), and determines the format of the received frame (610).

The format of the received frame can be determined by checking the setting value in the fifth field (the 17th byte and the 18th byte) of the received frame. More specifically, if the setting value is "0xF0F0", the received frame is determined as a fragment frame. If not, it is determined as a MAC-in-MAC frame.

Figure 19:
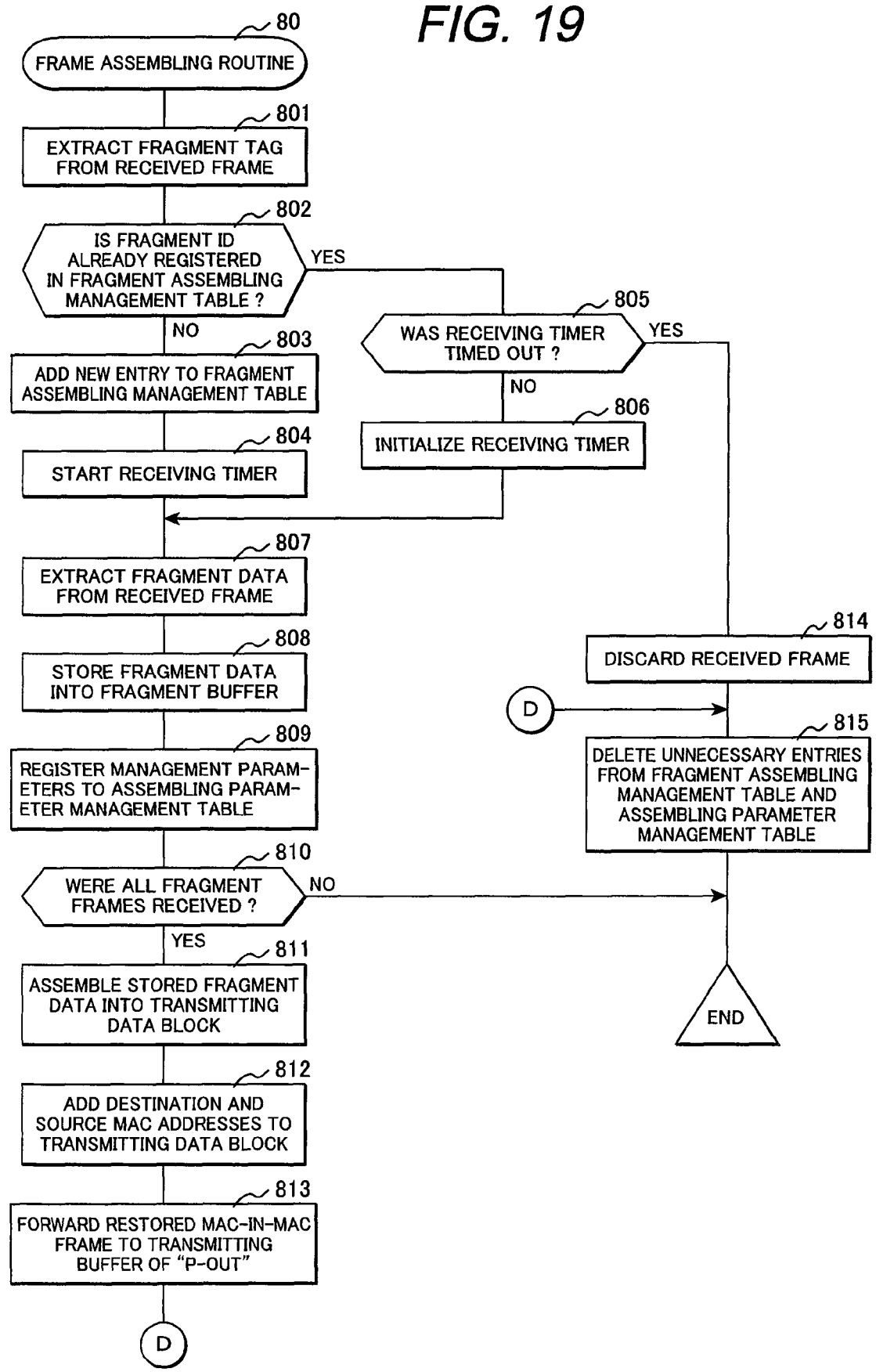
FIG. 19 is a flowchart of a frame assembling routine 80.

When the received frame is judged as a fragment frame, the processor 230 executes the frame assembling routine 80 which will be detailed by referring to FIG. 19, and exits the routine 60. When the received frame is judged as a MAC-in-MAC frame, the processor 230 retrieves a transmitting MTU corresponding to the forwarding destination port of the received frame from the port management table 41, and determines whether the payload length of the received frame exceeds the size of transmitting MTU (611).

Figure 18:
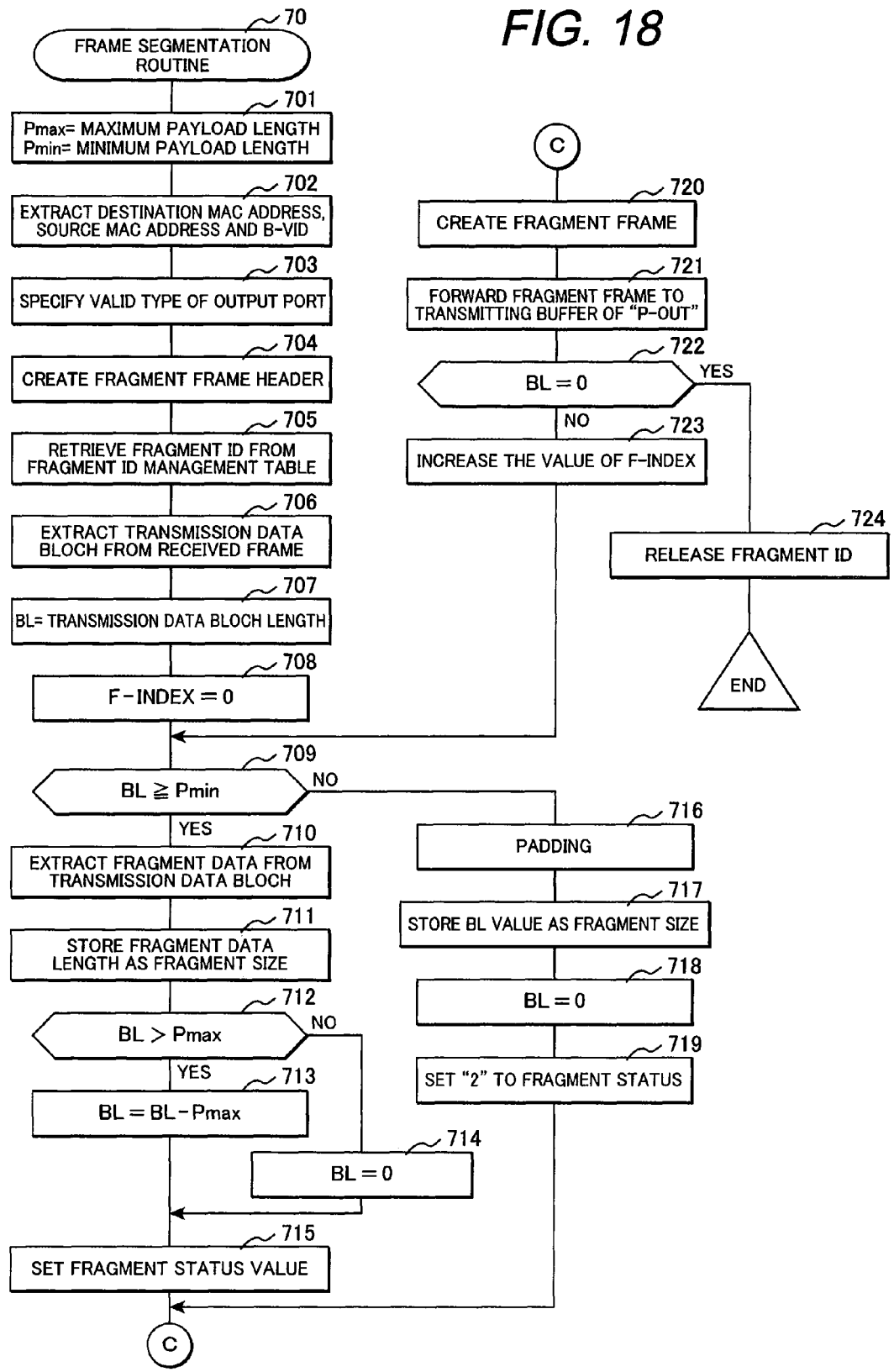
FIG. 18 is a flowchart of a frame segmentation routine 70.

If the payload length exceeds the size of transmitting MTU, the processor 230 executes the frame segmentation routine 70 which will be detailed by referring to FIG. 18, and exits the routine 60. If the payload length does not exceed the size of transmitting MTU, the processor 230 outputs the received frame to a transmitting buffer corresponding to the output port P-Out (612), and exits the routine 60. In the case where the received frame has to be forwarded (multicast) to a plurality of output ports and the payload length exceeds the transmitting MTU at any output port, the processor 230 executes the frame segmentation routine 70 shown in FIG. 18.

FIG. 18 is a flowchart of the frame segmentation routine 70.

In the frame segmentation routine 70, the processor 230 sets the maximum payload length (1496 bytes in the example of FIG. 4) of the fragment frame to a parameter Pmax, sets the minimum payload length (42 bytes in the example of FIG. 4) of the fragment frame to a parameter Pmin (step 701), and extracts the values of the destination MAC address 310, the source MAC address 311, and the B-VID 313 from the received frame (MAC-in-MAC frame) (702).

The processor 230 retrieves from the port management table 41, a table entry including the port ID 411 corresponding to the output port P-Out, and specifies the valid type 415 (703). For example, when the L2SW 22-1 receives the MAC-in-MAC frame 31 shown in FIG. 4, "0x8100" is specified as the valid type corresponding to the port ID "A100" of the output port P-Out.

The processor 230 creates the fragment frame header 320 by applying the specified valid type value "0x8100" and the fragment frame type value "0xF0F0" designated beforehand (704), retrieves a fragment ID having the minimum ID value from available fragment IDs in the fragment ID management table 43, and changes the value of the status flag 432 of the retrieved fragment ID from "0" to "1" as shown in FIG. 14B (705).

The processor 230 extracts, as a transmission data block, a frame portion other than the destination MAC address and the source MAC address from the received MAC-in-MAC frame (706), sets the transmission data block length as an initial value to a parameter BL (707), and sets a fragment index counter F-Index to an initial value "0" (708).

The processor 230 compares the parameters BL with Pmin (709). If BL≧Pmin, the processor 230 extracts fragment data from the first portion of the transmission data block (710), and stores the length of the extracted fragment data as the value of the fragment size 334 (711). At this time, the length of the fragment data extracted from the transmission data block is equal to Pmax in the case of BL≧Pmax, and BL in the case of BL<Pmax.

After that, the processor 230 updates the value of the parameter BL (712 to 714), sets to the fragment status 333 a value indicating which part of the first, intermediate, and last parts of the transmission data block is extracted as this fragment data (715), and creates a fragment frame (720). In updating the parameter BL, the processor 230 compares the current BL value with Pmax (712). In the case of BL>Pmax, new BL is updated to a value indicating "current BL−Pmax" (713). In the case of BL≦Pmax, new BL is updated to 0 (714).

If BL<Pmin at step 709, the processor 230 performs padding on the transmission data block (716), stores the current BL value as the value of the fragment size 334 (717), sets 0 to new BL (718), sets a value indicating the last block to the fragment status 333 (719), and creates a fragment frame (720).

At step 720, the fragment frame is created by concatenating the fragment frame header 320 created at step 704, a fragment tag 330 and the fragment data in this order. The fragment tag 330 is created at step 720 by using the fragment ID retrieved at step 705, the fragment index indicated by the fragment index counter F-Index, the fragment status set at step 715 or 719, and the fragment data size stored at step 711 or 717.

The processor 230 forwards the created fragment frame to a transmitting buffer 224-*x* corresponding to the output port P-Out (721). Then, the processor 230 determines the current value of the parameter BL (722). If BL is not equal to 0, the processor 230 increments the value of F-Index (723), and repeats the process from step 709.

If BL is equal to 0 at step 722, the processor 230 releases the unnecessary fragment ID, that is, updates the value of the corresponding status flag in the fragment ID management table 43 to "0" as shown in FIG. 14A (724), and exits the routine 70.

By executing the frame segmentation routine 70, the fragment frames 32-1 and 32-2 shown in FIG. 2 are sequentially outputted to the transmitting buffer 224-3 corresponding to the output port A100, and transmitted to the standard frame relaying network 24 through the output line interface 222-3. These fragment frames are received by the L2SW 22-2.

Upon receiving the fragment frame 32-1, the processor 230 of the L2SW 22-2 executes the frame receiving routine 60, adds a table entry shown in FIG. 13C to the switching information management table 42, and selects the frame assembling routine 80 at step 610.

FIG. 19 shows a flowchart of the frame assembling routine 80.

In the frame assembling routine 80, the processor 230 of the L2SW 22-2 extracts the contents of the fragment tag 330 from the received frame (801), and determines whether the fragment ID 331 has already been registered in the fragment assembling management table 44 (802).

If the fragment ID 331 has not been registered in the fragment assembling management table 44, the processor 230 adds a new table entry corresponding to the fragment ID 331 to the fragment assembling management table 44 (803), starts the receiving timer (804), and extracts fragment data from the payload 340 of the received frame in accordance with the fragment size 334 (807).

In the case where the received frame is the first fragment frame 32-1 shown in FIG. 5, a new table entry EN1 added to the fragment assembling management table 44 includes, as shown in FIG. 15B, the fragment ID "0", the destination MAC address "B100" and the source MAC address "A10" of the received frame, as values of the fragment ID 441, the destination MAC address 443, and the source MAC address 444, respectively, and the receiving timer 442 is set to an initial value "500 (ms)".

If the fragment ID 331 has already been registered in the fragment assembling management table 44 at step 802, the processor 230 determines whether the receiving timer 442 corresponding to the fragment ID 331 indicated by the fragment assembling management table 44 has already timed out (805). If the receiving timer has not timed out, the processor 230 updates the receiving timer to the initial value (806), and extracts fragment data from the payload 340 of the received frame (807).

After storing the fragment data extracted from the received frame in the fragment buffer 233 (808), the processor 230 registers management parameters corresponding to the fragment tag 330 of the received frame in the assembling parameter management table 45 (809).

When the L2SW 22-2 receives the first fragment frame 32-1 shown in FIG. 4, for example, a table entry EN01 including parameter values shown in FIG. 16B is registered in the assembling parameter management table 45. At this time, the value "0" of the fragment status 333 and the fragment index 332 extracted from the fragment tag 330 of the received frame are set to the fragment status 451 and the fragment index 452, respectively, and the address value "A" of the fragment data in the fragment buffer 233 is set to the fragment pointer 453.

Based on the values of the fragment status 451 and the fragment index 452 stored in the assembling parameter management table 45, the processor 230 determines whether all fragment frames necessary to restore the original MAC-in-MAC frame have been already received (810). If any of these fragment frames has not been received yet, the processor 230 exits the routine and waits for the next fragment frame having the same fragment ID.

When the L2SW 22-2 receives the second fragment frame 32-2 subsequent to the first fragment frame 32-1 shown in FIG. 4, a table entry EN02 corresponding to the second fragment frame 32-2 is added to the assembling parameter management table 45 as shown in FIG. 16C. At this time, the processor 230 judges that the second fragment frame 32-2 is the last fragment frame based on the value of the fragment status 451 in the table entry EN02. Further, as the values of the fragment index 452 in the table entries EN01 and EN02 are continuous, the processor 230 determines that all fragment frames necessary to restore the MAC-in-MAC frame 31 have been already received.

In this case, the processor 230 reads out a set of fragment data from the fragment buffer 233 in accordance with the fragment pointer 453 of the table entries EN01 and EN02 and restores the transmission data block by concatenating these fragment data in order of index indicated by the fragment index 452 (811).

The processor 230 restores the MAC-in-MAC frame by adding the destination MAC address and the source MAC address indicated by the received frame (the fragment frame 32-2 in this example) to the header portion of the transmission data block (812), and outputs the restored MAC-in-MAC frame to a transmitting buffer corresponding to the output port P-Out (813). After that, the processor 230 deletes the unnecessary table entry EN0 from the fragment assembling management table 44 and the unnecessary table entries EN01 and EN02 from the assembling parameter management table 45 (815), and exits the routine 80.

If the receiving timer has already timed out at step 805, the processor 230 discards the received frame (814), deletes the unnecessary table entries from the fragment assembling management table 44 and the assembling parameter management table 45 (815), and exits the routine 80.

In the case where a plurality of ports are designated as the output port P-Out of the frame at step 612 in the frame receiving routine 60, at step 721 in the frame segmentation routine 70, and at step 813 in the frame assembling routine 80, the processor 230 may omit specific output ports from forwarding destination ports of the restored frame. The specific output ports include an output port having a port ID with which the value of VID or B-VID indicated by the fourth field (the 15th byte and the 16th byte) of the transmission frame header is not registered as the VLAN-ID 414 in the port management table 41 (41A or 41B in FIG. 12) or a port ID with which the value of TPID or B-TPID indicated by the third field (the 13th byte and the 14th byte) is not registered as the valid type 415 in the port management table 41 (41A or 41B shown in FIG. 12).

However, even if same frames are transmitted from a plurality of output ports, each node device having received the frame can discard an unnecessary frame by judging the destination MAC address of the received frame. Consequently, one of multicast frames transmitted by the L2SW 22-1 can be forwarded to a specific L2SW or L2GW corresponding to the destination MAC address.

As apparent from the above-described operation of the L2SWs 22, according to this embodiment, the L2SW 22-1 connected to the standard frame relaying network 24 determines the payload length of the MAC-in-MAC frame received from the L2GW 21-1 and forwards the received frame to the standard frame relaying network 24 after segmenting it into a plurality of fragment frames suitable in size for the relaying network 24 when the received frame is longer than the transmitting MTU size of the standard frame relaying network 24. Further, the L2SW 22-2 having received these fragment frames from the standard frame relaying network 24 restores the original MAC-in-MAC frame and forwards the restored MAC-in-MAC frame to the L2GW 21-3 on the destination terminal side. Therefore, the L2SWs 22 according to the invention can forward the extended frame with reliability even if the payload length of the extended frame such as the MAC-in-MAC frame exceeds the size defined by the standard frame relaying network 24.

In the above embodiment, although description has been made of the network configuration in which the L2SW 22-1 segments the MAC-in-MAC frame into a plurality of fragment frames and the L2SW 22-2 restores the original MAC-in-MAC frame, the invention is effective in the case where the L2SWs 22 receives communication frames other than the MAC-in-MAC frame in Ethernet frame format, for example, a frame of the layer 2 tunneling protocol such as the extended VLAN, PPPoE, etc.

The invention does not limit the fragment frame to be created by the L2SW 22 to a frame format having the fragment tag 330 shown in the embodiment. Further, the relaying network for forwarding the fragment frame is not limited to a network having an MTU of 1500 bytes shown in the embodiment. Although the frame segmentation routine and the frame assembling routine are executed by the processor 230 in the embodiment, the L2SWs 22 may have a system configuration in which the frame segmentation function is distributed to a plurality of input line interfaces and the frame assembling function is distributed to a plurality of output line interfaces.

What is claimed is:

1. A packet forwarding apparatus having plural pairs of input and output ports to be identified by a port identifier and forwarding a frame received from each input port to one of output ports specified by a destination MAC address, the packet forwarding apparatus comprising:

a switching information management table for storing, in association with each destination address, a port identifier indicating a forwarding destination port of a received frame;

a port management table for storing a transmitting MTU size in association with each port identifier;

routing means for specifying the forwarding destination port identifier of each received frame in accordance with the switching information management table;

fragment frame creating means for segmenting a received frame into a plurality of data blocks shorter than the transmitting MTU (Maximum Transmission Unit) size and creating a plurality of fragment frames each including one of said data blocks in its payload when the payload length of the received frame exceeds the transmitting MTU size corresponding to the forwarding destination port identifier indicated by the port management table; and frame assembling means for temporarily storing a plurality of fragment frames received by one of said input ports and restoring an original frame from the plurality of fragment frames, wherein one of said received frame, said fragment frames created by said fragment frame creating means, and said original frame restored by said frame assembling means is selectively forwarded to the output port having the forwarding destination port identifier specified by said routing means.

2. The packet forwarding apparatus according to claim 1, wherein
said received frame has an Ethernet header including a destination MAC address and a source MAC address; and
each of said fragment frames created by said fragment frame creating means comprises a frame header including the destination MAC address and the source MAC address extracted from the Ethernet header of said received frame, a fragment tag, and a payload,
said payload including one of data blocks created by segmenting said received frame, and
said fragment tag including a fragment ID for uniquely identifying an original Ethernet frame, a fragment index indicating fragment frame creation order, a fragment status indicating a distinction of a first frame, an intermediate frame, and a last frame in a series of fragment frames created from the same Ethernet frame, and a fragment size indicating the length of a data block in said payload.

3. The packet forwarding apparatus according to claim 2, wherein said fragment frame creating means segments a frame portion other than the destination MAC address and the source MAC address of each of said received frames into a plurality of data blocks and creates said plurality fragment frames.

4. The packet forwarding apparatus according to claim 2, wherein said frame assembling means restores said original frame when a fragment frame having the fragment status indicating the last frame is received, by concatenating a plurality of data blocks extracted from payloads of fragment frames each having the same fragment ID as the received fragment frame, in order of the fragment index.

5. The packet forwarding apparatus according to claim 2, wherein
said fragment frame creating means segments a frame portion other than the destination MAC address and the source MAC address of the received frame into a plurality of data blocks and creates a plurality of fragment frames; and
said frame assembling means restores said original frame when a fragment frame having the fragment status indicating the last frame is received, by concatenating a plurality of data blocks extracted from payloads of fragment frames each having the same fragment ID as the received fragment frame, in order of the fragment index, and adding the destination MAC address and the source MAC address extracted from the Ethernet frame header of one of said fragment frames to a frame header located at a head of said concatenated data blocks.

6. The packet forwarding apparatus according to claim 2, wherein each of said Ethernet frame and said fragment frames includes in its frame header, in addition to said destination MAC address and said source MAC address, a protocol type identifier for discriminating the fragment frames from the Ethernet frame.

7. The packet forwarding apparatus according to claim 2, further comprising:
an assembling parameter management table for managing, in association with the fragment ID, values of the fragment status and the fragment index indicated by the fragment tag of each of said received fragment frames and the data block extracted from the payload of the fragment frame,
wherein said the frame assembling means restores the original frame from fragment frames having the same fragment ID when a fragment frame with the fragment status indicating the last frame is received, by checking that all fragment frames necessary to restore the original frame have already been received based on the assembling parameter management table.

8. The packet forwarding apparatus according to claim 3, further comprising:
an assembling parameter management table for managing, in association with the fragment ID, values of the fragment status and the fragment index indicated by the fragment tag of each of said received fragment frames and the data block extracted from the payload of the fragment frame,
wherein said the frame assembling means restores the original frame from fragment frames having the same fragment ID when a fragment frame with the fragment status indicating the last frame is received, by checking that all fragment frames necessary to restore the original frame have already been received based on the assembling parameter management table.

9. The packet forwarding apparatus according to claim 4, further comprising:
an assembling parameter management table for managing, in association with the fragment ID, values of the fragment status and the fragment index indicated by the fragment tag of each of said received fragment frames and the data block extracted from the payload of the fragment frame,
wherein said the frame assembling means restores the original frame from fragment frames having the same fragment ID when a fragment frame with the fragment status indicating the last frame is received, by checking that all fragment frames necessary to restore the original frame have already been received based on the assembling parameter management table.

10. The packet forwarding apparatus according to claim 5, further comprising:
an assembling parameter management table for managing, in association with the fragment ID, values of the fragment status and the fragment index indicated by the fragment tag of each of said received fragment frames and the data block extracted from the payload of the fragment frame,
wherein said the frame assembling means restores the original frame from fragment frames having the same fragment ID when a fragment frame with the fragment status indicating the last frame is received, by checking that all fragment frames necessary to restore the original frame have already been received based on the assembling parameter management table.

11. The packet forwarding apparatus according to claim 6, further comprising:
an assembling parameter management table for managing, in association with the fragment ID, values of the fragment status and the fragment index indicated by the fragment tag of each of said received fragment frames and the data block extracted from the payload of the fragment frame,
wherein said the frame assembling means restores the original frame from fragment frames having the same fragment ID when a fragment frame with the fragment status indicating the last frame is received, by checking that all fragment frames necessary to restore the original frame have already been received based on the assembling parameter management table.

12. The packet forwarding apparatus according to claim 2, wherein said fragment frame creating means converts a received frame having extended frame structure, in which an Ethernet frame is encapsulated with another Ethernet header, into a plurality of fragment frames.

13. The packet forwarding apparatus according to claim 3, wherein said fragment frame creating means converts a received frame having extended frame structure, in which an Ethernet frame is encapsulated with another Ethernet header, into a plurality of fragment frames.

14. The packet forwarding apparatus according to claim 4, wherein said fragment frame creating means converts a received frame having extended frame structure, in which an Ethernet frame is encapsulated with another Ethernet header, into a plurality of fragment frames.

15. The packet forwarding apparatus according to claim 5, wherein said fragment frame creating means converts a received frame having extended frame structure, in which an Ethernet frame is encapsulated with another Ethernet header, into a plurality of fragment frames.

16. The packet forwarding apparatus according to claim 6, wherein said fragment frame creating means converts a received frame having extended frame structure, in which an Ethernet frame is encapsulated with another Ethernet header, into a plurality of fragment frames.

17. The packet forwarding apparatus according to claim 7, wherein said fragment frame creating means converts a received frame having extended frame structure, in which an Ethernet frame is encapsulated with another Ethernet header, into a plurality of fragment frames.

* * * * *